(12) United States Patent
Lloyd et al.

(10) Patent No.: US 8,545,231 B2
(45) Date of Patent: Oct. 1, 2013

(54) OBSTRUCTIVE SLEEP APNEA DEMONSTRATION MODEL DEVICE

(76) Inventors: Charles Richard Lloyd, Lawreneville, GA (US); Richard Edwin Klein, Warren, MI (US)

( * ) Notice: Subject to any disclaimer, the term of this patent is extended or adjusted under 35 U.S.C. 154(b) by 686 days.

(21) Appl. No.: 12/823,109

(22) Filed: Jun. 24, 2010

(65) Prior Publication Data

US 2010/0330546 A1 Dec. 30, 2010

Related U.S. Application Data

(60) Provisional application No. 61/220,570, filed on Jun. 25, 2009.

(51) Int. Cl.
*G09B 23/28* (2006.01)
(52) U.S. Cl.
USPC .......................................... 434/270
(58) Field of Classification Search
USPC .......................................... 434/270
See application file for complete search history.

(56) References Cited

U.S. PATENT DOCUMENTS

| | | | | | |
|---|---|---|---|---|---|
| 2,419,658 | A | * | 4/1947 | Rogers | 434/126 |
| 2,696,056 | A | * | 12/1954 | Kistler et al. | 434/256 |
| 5,154,608 | A | * | 10/1992 | Feher | 433/57 |
| 5,203,343 | A | * | 4/1993 | Axe et al. | 600/538 |
| 5,313,937 | A | * | 5/1994 | Zdrojkowski | 128/202.22 |
| 5,458,137 | A | * | 10/1995 | Axe et al. | 128/204.23 |
| 5,632,269 | A | * | 5/1997 | Zdrojkowski | 128/204.23 |
| 5,645,053 | A | * | 7/1997 | Remmers et al. | 128/204.23 |
| 5,724,965 | A | * | 3/1998 | Handke et al. | 128/207.13 |
| 6,087,747 | A | * | 7/2000 | Dhuler et al. | 310/90 |
| 7,004,908 | B2 | * | 2/2006 | Sullivan et al. | 600/529 |
| 7,331,349 | B2 | * | 2/2008 | Brady et al. | 128/848 |
| 7,890,342 | B1 | * | 2/2011 | Yruko et al. | 705/2 |
| 7,942,844 | B2 | * | 5/2011 | Moberg et al. | 604/65 |
| 8,042,542 | B2 | * | 10/2011 | Ging et al. | 128/207.11 |
| 2005/0061326 | A1 | * | 3/2005 | Payne, Jr. | 128/206.11 |
| 2008/0051674 | A1 | * | 2/2008 | Davenport et al. | 600/561 |
| 2008/0319277 | A1 | * | 12/2008 | Bradley | 600/301 |
| 2010/0258137 | A1 | * | 10/2010 | Scott | 128/848 |
| 2012/0022609 | A1 | * | 1/2012 | Bolea et al. | 607/42 |

* cited by examiner

*Primary Examiner* — Kurt Fernstrom
*Assistant Examiner* — Dolores Collins
(74) *Attorney, Agent, or Firm* — Michael Ries

(57) ABSTRACT

The present invention is an obstructive sleep apnea demonstration model device for a user and a patient. The device includes a vertical display stand with a horizontal base, a vertical front surface and a horizontal flange, a vertical side profile base with a removed oral cavity portion attached to the display stand and disposed within the horizontal flange, a top movable side piece with an upper lip, a set of upper teeth, a hinge and a palate. The device also includes a back elongated movable side piece disposed behind the top side piece that hinges on the palate, a chin assembly side piece with a chin, a lower lip, a set of lower teeth and a tongue and an intraoral appliance that is placed between the upper teeth and the lower teeth to treat the patient with an obstructive sleep apnea condition.

14 Claims, 3 Drawing Sheets

OBSTRUCTIVE SLEEP APNEA DEMONSTRATION MODEL DEVICE

This application claims priority to U.S. Provisional Application 61/220,570 filed on Jun. 25, 2009, the entire disclosure of which is incorporated by reference.

TECHNICAL FIELD & BACKGROUND

The present invention generally relates to a medical demonstration model device. More specifically, the invention is an obstructive sleep apnea demonstration model device.

It is an object of the invention to provide a demonstration model device that illustrates how obstructive sleep apnea occurs.

It is an object of the invention to provide a demonstration model device that illustrates a simulation of soft tissue oral collapse involved with obstructive sleep apnea and how it is controlled using an oral appliance.

What is really needed is a sleep apnea demonstration model device that illustrates how obstructive sleep apnea occurs and that shows a patient how an oral appliance can control the soft tissue oral collapse that is involved with obstructive sleep apnea.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
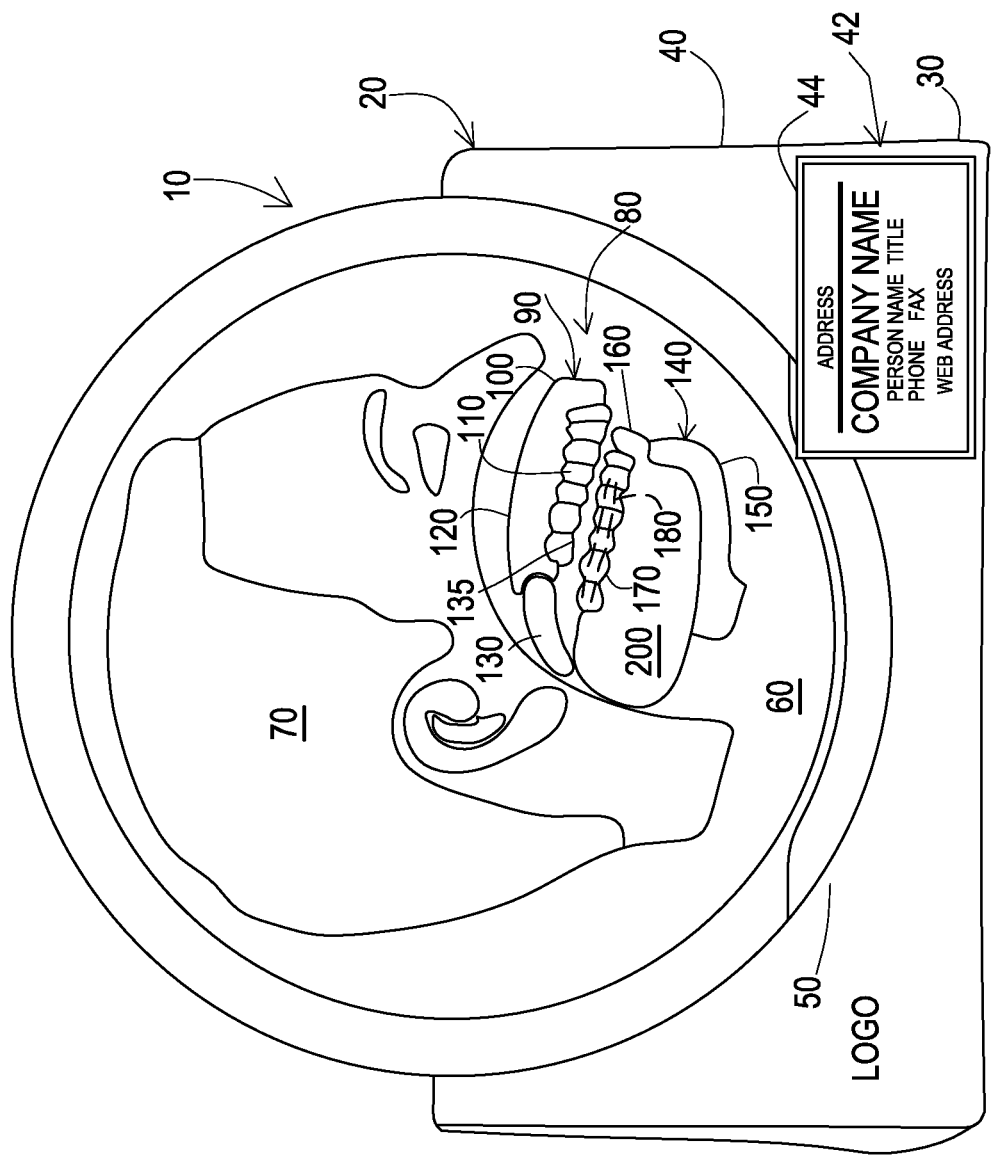
FIG. 1 illustrates a front perspective view of an obstructive sleep apnea demonstration model device in an upright position, in accordance with one embodiment of the present invention.
Figure 2:
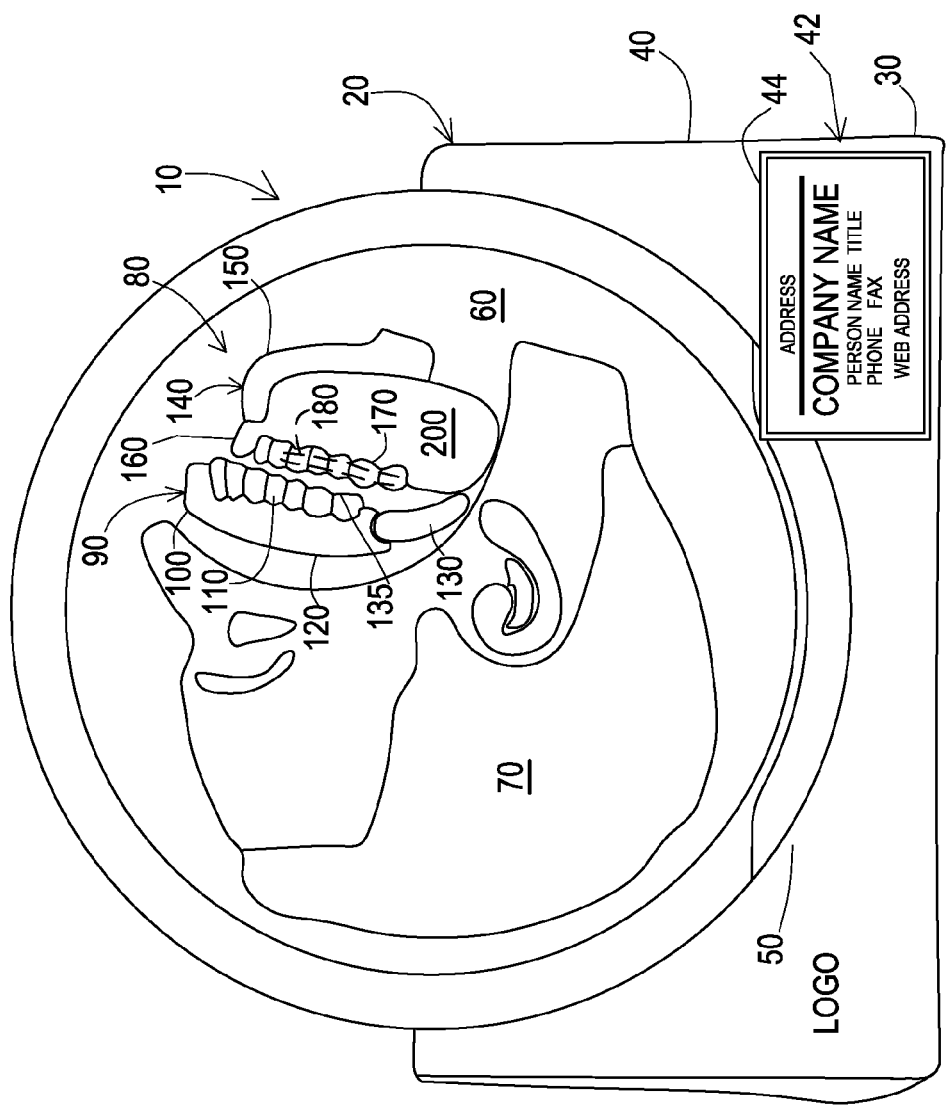
FIG. 2 illustrates a front perspective view of an obstructive sleep apnea demonstration model device showing a patient's uncorrected obstructive airway in a supine position, in accordance with one embodiment of the present invention.

FIG. 1 illustrates a front perspective view of an obstructive sleep apnea demonstration model device 10 in an upright position, in accordance with one embodiment of the present invention. FIG. 2 illustrates a front perspective view of an obstructive sleep apnea demonstration model device 10 showing a patient's uncorrected obstructive airway in a supine position, in accordance with one embodiment of the present invention. The obstructive sleep apnea demonstration model device 10 is designed for a user, such as a doctor or other medical profession and a patient (both not shown). The device 10 has a vertical display stand 20 with a horizontal base 30, a vertical front surface 40 and a horizontal flange 50. The vertical front surface 40 has a vertical pocket 42 to hold a business card 44 that could be provided by the user. The vertical pocket 42 is transparent to allow clear viewing of the business card 44. There is also a vertical side profile base 60 with a raised surface demonstration human head 70 with a removed oral cavity portion 80 that is rotatably attached to the display stand 20 and disposed within the horizontal flange 50. As is illustrated in FIG. 2, the side profile base 60 can be rotated 90° to simulate the head 70 in a supine position, where the head 70 can simulate a representative patient's head. The supine position is a position of the body lying down face-up, as opposed to the prone position, which is face down. The supine position is a position where the patient's face and head are facing up while the patient is lying flat.

The device 10 includes a top movable side piece 90 with a raised surface upper lip 100, a raised surface set of upper teeth 110 and a raised surface palate 120 disposed on the removed oral cavity portion 80. There is also a back elongated movably side piece 130 disposed behind the top side piece 90 that hinges on a hinge 135 attached to the palate 120 disposed on the removed oral cavity portion 80 and a chin assembly side piece 140 with a raised surface chin 150, a raised surface lower lip 160, a raised surface set of lower teeth 170 and a tongue 180 that is held and slidably disposed on the removed oral cavity portion 80. The chin assembly 140 is held by a plurality of light springs (not shown) and the chin assembly 140 can be slid forward and backward to accommodate an intraoral appliance (FIG. 3, 190) to correct the patient's obstructive sleep apnea condition. The chin assembly 140 can be slid to simulate a malocclusion such as a class 3 malocclusion. A malocclusion is a misalignment of teeth and/or incorrect relation between the teeth of the two dental arches. The upper arch is called the maxilla and the lower arch is called the mandible. A class 3 malocclusion is when the lower front teeth protrude due to the lower teeth and/or jaw being positioned relatively ahead of the upper teeth and/or jaw. A class 3 malocclusion is where your lower teeth stick out past your upper teeth. This is also more commonly called an under bite.

Figure 3:
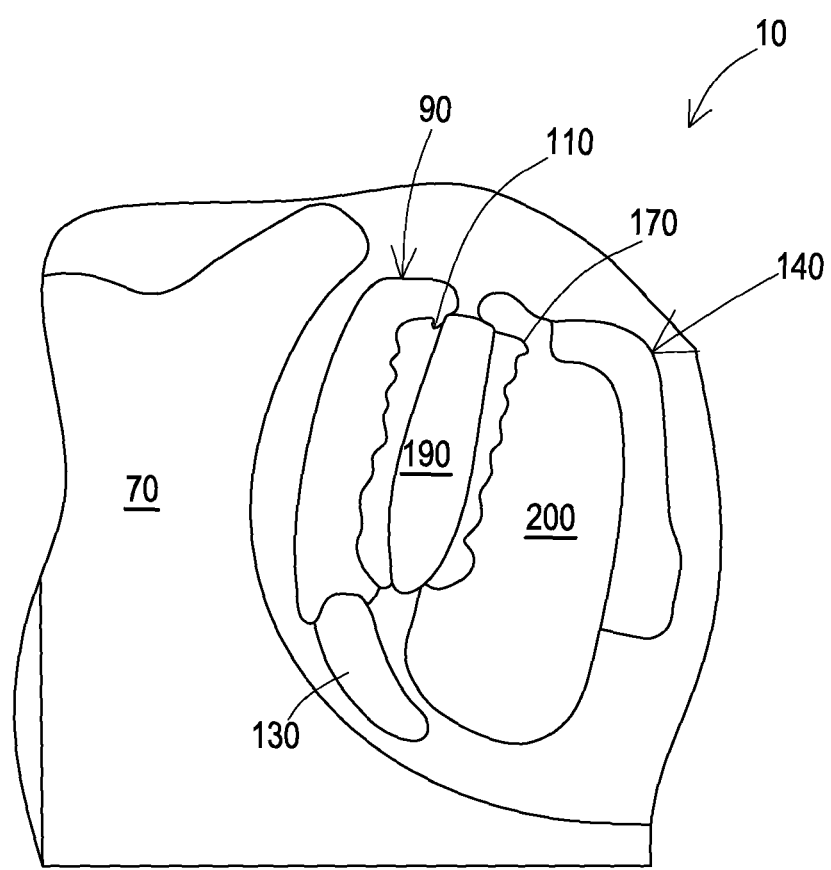
FIG. 3 illustrates a front perspective view of an obstructive sleep apnea demonstration model device showing a corrected obstructive sleep apnea position using a corrective intraoral appliance, in accordance with one embodiment of the present invention.

FIG. 3 illustrates a front perspective view of an obstructive sleep apnea demonstration model device 10 showing a corrected obstructive sleep apnea position using a corrective intraoral appliance 150, in accordance with one embodiment of the present invention. The intraoral appliance 150 has a raised surface that is placed between the upper teeth 110 and the lower teeth 170 to treat the patient with an obstructive sleep apnea condition. The intraoral appliance 150 is placed in a plurality of small holes (not shown) on the upper teeth 110 and the lower teeth 170 so that the appliance 150 holds the mandible 200 forward to prevent the tongue 180 and throat tissues (not shown) from collapsing onto the back of the patient's throat to treat and relieve the patient with an obstructive sleep apnea condition. The mandible 200 forms the lower jaw and holds the lower teeth 170 in place. The obstructive sleep apnea demonstration model device 10 is also made of polyurethane resin, although other materials that are well known in the art can also be used.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. An obstructive sleep apnea demonstration model device for a user and a patient, comprising:
   a vertical display stand with a horizontal base, a vertical front surface and a horizontal flange;
   a vertical side profile base with a raised surface demonstration human head with a removed oral cavity portion that is rotatably attached to said display stand and disposed within said horizontal flange;
   a top movable side piece with a raised surface upper lip, a raised surface set of upper teeth and a raised surface palate disposed on said removed oral cavity portion;
   a back elongated movably side piece disposed behind said top side piece that hinges on a hinge attached to said palate disposed on said removed oral cavity portion;
   a chin assembly side piece with a raised surface chin, a raised surface lower lip, a raised surface set of lower teeth and a raised surface tongue that is held and slidably disposed on said oral cavity portion; and
   an intraoral appliance with a raised surface that is placed between said upper teeth and said lower teeth to treat said patient with an obstructive sleep apnea condition.

2. The device according to claim 1, wherein said vertical front surface has a vertical pocket to hold a business card.

3. The device according to claim 2, wherein said vertical pocket is transparent to allow clear viewing of said business card.

4. The device according to claim 1, wherein said side profile base is rotated ninety degrees to simulate said head in a supine position.

5. The device according to claim 4, wherein said head simulates a patient's head.

6. The device according to claim 1, wherein said profile base is removed from said display stand for separate use.

7. The device according to claim 6, wherein said profile base is mounted on a vertical surface.

8. The device according to claim 7, wherein said vertical surface is a wall.

9. The device according to claim 1, wherein said chin assembly is held by a plurality of light springs.

10. The device according to claim 1, wherein said chin assembly is slid forward and backward along said hinge.

11. The device according to claim 1, wherein said chin assembly is slid to simulate a malocclusion.

12. The device according to claim 11, wherein said malocclusion is a class 3 malocclusion.

13. The device according to claim 1, wherein said appliance holds said mandible forward to prevent said tongue and a plurality of throat tissues from collapsing onto a treated patient's backside of throat with an obstructive sleep apnea condition.

14. The device according to claim 1, wherein said device is made of polyurethane resin.

* * * * *